United States Patent
Caprioli et al.

(10) Patent No.: US 7,757,068 B2
(45) Date of Patent: Jul. 13, 2010

(54) METHOD AND APPARATUS FOR MEASURING PERFORMANCE DURING SPECULATIVE EXECUTION

(75) Inventors: Paul Caprioli, Santa Clara, CA (US); Shailender Chaudhry, San Francisco, CA (US); Sherman H. Yip, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 213 days.

(21) Appl. No.: 11/654,270

(22) Filed: Jan. 16, 2007

(65) Prior Publication Data

US 2008/0172548 A1  Jul. 17, 2008

(51) Int. Cl.
*G06F 7/38* (2006.01)
(52) U.S. Cl. ..................................... 712/220
(58) Field of Classification Search ................ 712/220
See application file for complete search history.

(56) References Cited

U.S. PATENT DOCUMENTS

2004/0024996 A1* 2/2004 Le et al. .................... 712/228
2004/0225870 A1* 11/2004 Srinivasan et al. ........... 712/235
2006/0212688 A1* 9/2006 Chaudhry et al. ........... 712/228

\* cited by examiner

*Primary Examiner*—Eddie P Chan
*Assistant Examiner*—John Lindlof
(74) *Attorney, Agent, or Firm*—Park, Vaughan & Fleming LLP; Anthony P. Jones

(57) ABSTRACT

One embodiment of the present invention provides a system for measuring processor performance during speculative-execution. The system starts by executing instructions in a normal-execution mode. The system then enters a speculative-execution episode wherein instructions are speculatively executed without being committed to the architectural state of the processor. While entering the speculative-execution episode the system enables a speculative execution monitor. The system then uses the speculative execution monitor to monitor instructions during the speculative-execution episode to record data values relating to the speculative-execution episode. Upon returning to normal-execution mode, the system disables the speculative execution monitor. The data values recorded by the speculative execution monitor facilitate measuring processor performance during speculative execution.

21 Claims, 3 Drawing Sheets

METHOD AND APPARATUS FOR MEASURING PERFORMANCE DURING SPECULATIVE EXECUTION

BACKGROUND

1. Field of the Invention

The present relates to techniques for improving computer system performance. More specifically, the present invention relates to techniques for measuring performance during speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load generates a cache miss, the subsequent access to level-two (L2) cache or memory can require dozens or hundreds of clock cycles to complete, during which time the processor is typically stalled (and therefore idle), performing no useful work.

A number of forms of "speculative execution" have been proposed or are presently used to prevent the processor from stalling when a cache miss occurs. Some processors support "out-of-order execution," in which instructions are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers which are available for register renaming purposes during out-of-order execution also limits the effective size of the issue queue.

Some processor designers have proposed generating a checkpoint and entering a "scout mode" during processor stall conditions. In scout mode, instructions are speculatively executed to prefetch future loads, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. By avoiding the need to re-order instructions that were issued out-of-order, the scout mode technique avoids the need for complex instruction control structures. However, scout mode suffers from the disadvantage of having to re-compute results of computational operations that were performed during scout mode.

To avoid performing some of these re-computations, processor designers have proposed entering an "execute-ahead" mode when the processor encounters a data-dependent stall condition. In execute-ahead mode, the processor defers instructions that cannot be executed because of unresolved data dependencies and executes other non-deferred instructions in program order.

When a data dependency is ultimately resolved, the processor transitions to a "deferred mode" to execute the deferred instructions. In deferred mode, the processor executes deferred instructions that are able to be executed while re-deferring deferred instructions that still cannot be executed because of unresolved data dependencies. For example, see U.S. Pat. No. 7,114,060, filed 14 Oct. 2003, entitled, "Selectively Deferring the Execution of Instructions with Unresolved Data Dependencies as They Are Issued in Program Order," by inventors Shailender Chaudhry and Marc Tremblay.

To achieve good performance, it is desirable to be able to measure the performance of processor designs that support the above-described speculative-execution techniques while executing real program code. These performance measurements can then be used to optimize system performance. For example, runtime compilers can use performance measurements to dynamically optimize code. Similarly, operating systems can use performance measurements to determine how processes interact, which allows the operating systems to efficiently schedule the processes to optimize interactions between processes.

Although there exist several methods for measuring processor performance, there is presently no way to accurately measure specific aspects of processor performance during speculative execution. Some performance measurement systems use statistical profiling methods to project the performance of the processor from the sampling of a few instructions out of a larger group of instructions. Such a system is described in U.S. patent application Ser. No.11/405,965, filed 17 Apr. 2006, entitled, "Method and Apparatus for Sampling Instructions on a Processor that Supports Speculative Execution," by inventors Shailender Chaudhry, Paul Caprioli, and Sherman H. Yip. Unfortunately, due to the nature of speculative execution, statistical profiling does not provide sufficiently accurate measurements of several important performance indicators during speculative execution. For example, because statistical profiling systems only sample a small percentage of the instructions, they do not provide an accurate record of the source and status of all instructions executed during a speculative-execution episode.

When such performance measurements are inaccurate, users of the performance measurements, such as processor designers, programmers, operating systems, and compilers, use these inaccurate performance measurements to make suboptimal decisions which can lead to sub-optimal system performance.

Hence, what is needed is a method and an apparatus for evaluating the performance of a processor that supports speculative execution without the above-described problems.

SUMMARY

One embodiment of the present invention provides a system for measuring processor performance during speculative-execution. The system starts by executing instructions in a normal-execution mode. The system then enters a speculative-execution episode wherein instructions are speculatively executed without being committed to the architectural state of the processor. While entering the speculative-execution episode, the system enables a speculative execution monitor which monitors instructions during the speculative-execution episode and records data values relating to the speculative-execution episode. Upon returning to normal-execution mode, the system disables the speculative execution monitor. The data values recorded by the speculative execution monitor facilitate measuring processor performance during speculative-execution.

In a variation of this embodiment, if a predetermined condition is met, when the system disables the speculative execution monitor, the system reports the data values recorded by the speculative execution monitor.

In a further variation, the predetermined condition includes at least one of: (1) a thread ID; (2) an outcome of the speculative-execution episode; (3) a failure reason, if the speculative-execution episode fails; (4) a number of cycles in the speculative-execution episode; (5) a program counter of the oldest instruction in the speculative-execution episode; or (6) a number of speculative-execution episodes that have occurred since the recorded data values were last reported.

In a variation of this embodiment, enabling the speculative instruction monitor involves pseudo-randomly selecting the speculative-execution episode for monitoring.

In a variation of this embodiment, monitoring instructions during the speculative-execution episode involves recording information about the source and status of speculatively executed instructions, including: (1) instructions that issued from the issue queue and which are not placed in the deferred queue; (2) instructions that issued from the issue queue and which are placed in the deferred queue; (3) instructions that issued from the deferred queue and which are not placed in the deferred queue; and (4) instructions that issued from the deferred queue and which are placed in the deferred queue (i.e., instructions that are re-deferred).

In a further variation, monitoring instructions during the speculative-execution episode involves recording data values which can include one or more of the following: (1) a thread ID; (2) an outcome of the speculative-execution episode; (3) a failure reason, if the speculative episode fails; (4) a number of cycles in the speculative-execution episode; and (5) a program counter of the oldest instruction in the speculative-execution episode.

In a variation of this embodiment, during the speculative-execution episode, the processor operates in an execute-ahead mode, wherein instructions that cannot be executed because of an unresolved data dependency are deferred, and wherein other non-deferred instructions are executed in program order.

In a variation of this embodiment, during the speculative-execution episode, the processor operates in a deferred mode wherein deferred instructions are executed in program order, and wherein deferred instructions that still cannot be executed because of unresolved data dependencies are deferred again.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Processor

Figure 1:
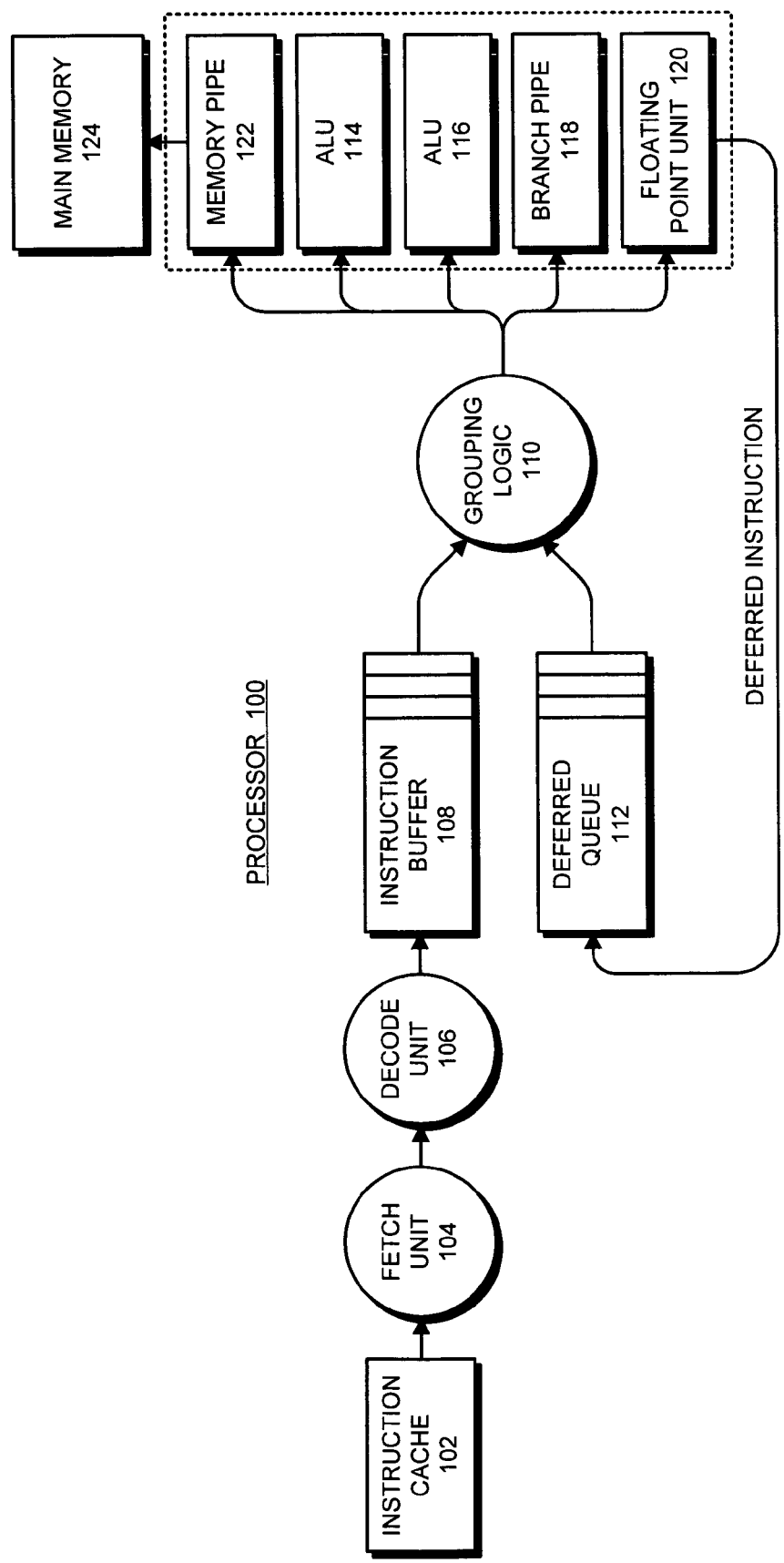
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120 and memory pipe 122.

During operation, fetch unit 104 retrieves instructions to be executed from instruction cache 102, and feeds these instructions into decode unit 106. Decode unit 106 then forwards the instructions to be executed into instruction buffer 108, which is organized as a FIFO buffer. Next, instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Like instruction buffer 108, deferred queue 112 is organized as a FIFO buffer.

When the data dependency is eventually resolved, instructions from deferred queue 112 are executed in program order with respect to other deferred instructions 206, but not with respect to other previously executed non-deferred instructions.

Figure 2:
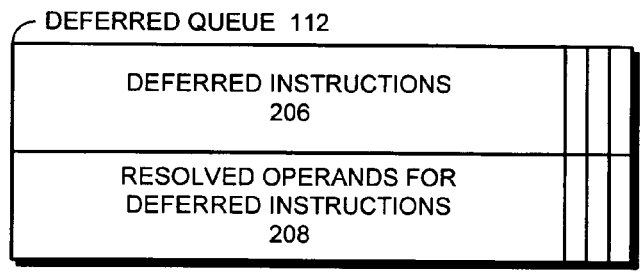
FIG. 2 illustrates a deferred queue in accordance with an embodiment of the present invention.

FIG. 2 illustrates a more detailed view of deferred queue 112 in accordance with an embodiment of the present invention. As was described above, deferred queue 112 stores deferred instructions 206, which are waiting for unresolved data dependencies to be resolved. In addition to storing deferred instructions, deferred queue 112 also stores corresponding operands 208 that have been resolved for the deferred instructions. When the deferred instructions 206 are finally executed in deferred mode, these deferred instructions 206 use the resolved source operands 208 from deferred queue 112, if such resolved operands were previously stored along with the instructions in the deferred queue 112. In this way, instructions following the deferred instructions that overwrite the resolved source operands do not create RAW hazards, because the deferred instructions use the previously stored resolved operands 208 for the deferred instructions from deferred queue 112. This process is described in more detail below.

State Diagram

Figure 3:
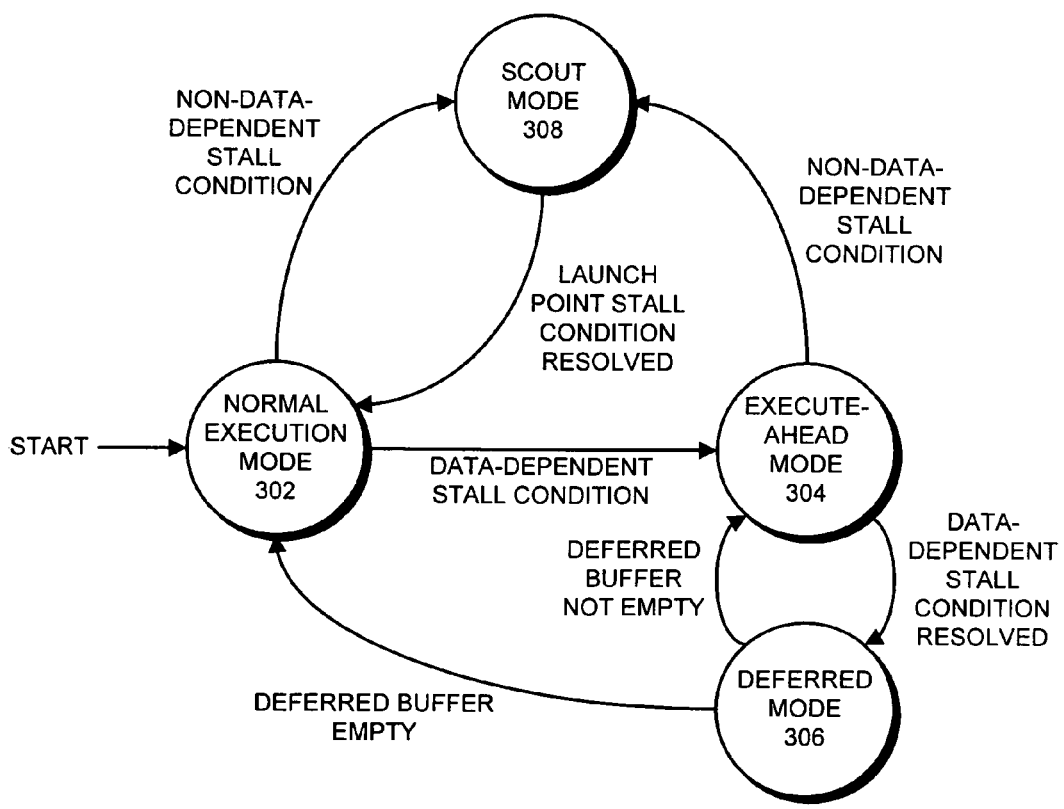
FIG. 3 presents a state diagram, which includes execute-ahead mode, deferred mode, and scout mode in accordance with an embodiment of the present invention.

FIG. 3 presents a state diagram which includes execute-ahead mode 304, deferred mode 306, and scout mode 308 in accordance with an embodiment of the present invention. The system starts in normal-execution mode 302, wherein instructions are executed in program order as they are issued from instruction buffer 108 (see FIG. 1).

Next, if an unresolved data dependency arises during execution of an instruction, the system moves to execute-ahead mode 304. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 304, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 304 or deferred mode 306.) The system also "defers" execution of the instruction that encountered the unresolved data dependency by storing the instruction in deferred queue 112.

While operating in execute-ahead mode 304, the system continues to execute instructions in program order as they are received from instruction buffer 108; any instructions that cannot execute because of an unresolved data dependency are deferred into deferred queue 112.

During execute-ahead mode 304, if an unresolved data dependency is finally resolved, the system moves into deferred mode 306, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112. On the other hand, the system executes other instructions that can be executed in program order with respect to each other.

After the system completes a pass through deferred queue 112, if deferred queue 112 is empty, the system moves back into normal-execution mode 302. This involves performing a "join" operation to commit changes made during execute-ahead mode 304 and deferred mode 306 to the architectural state of processor 100, if such changes have not been already committed. It can also involve throwing away the checkpoint generated when the system moved into execute-ahead mode 304.

On the other hand, if deferred queue 112 is not empty after the system completes a pass through deferred queue 112, the system returns to execute-ahead mode 304 to execute instructions from instruction buffer 108 from the point where the execute-ahead mode 304 left off.

If a non-data dependent stall condition arises while the system is in normal-execution mode 302 or in execute-ahead mode 304, the system moves into scout mode 308. For example, this non-data-dependent stall condition can include a memory barrier operation, or a deferred queue full condition. In scout mode 308, instructions are speculatively executed to prefetch future memory operations, but results are not committed to the architectural state of processor 100.

Scout mode 308 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 308.

Unfortunately, computational operations performed during scout mode 308 need to be recomputed again, which can require a large amount of computational work.

When the original "launch point" stall condition is finally resolved, the system moves back into normal-execution mode 302, and, in doing so, uses the previously generated checkpoint to resume execution from the launch point instruction that encountered the launch point stall condition (effectively "flushing" the results of speculative execution). The launch point stall condition is the stall condition that originally caused the system to move out of normal-execution mode 302. For example, the launch point stall condition can be the data-dependent stall condition that caused the system to move from normal-execution mode 302 to execute-ahead mode 304, before moving to scout mode 308. Alternatively, the launch point stall condition can be the non-data-dependent stall condition that caused the system to move directly from normal-execution mode 302 to scout mode 308.

Speculative Execution Monitor

Figure 4:
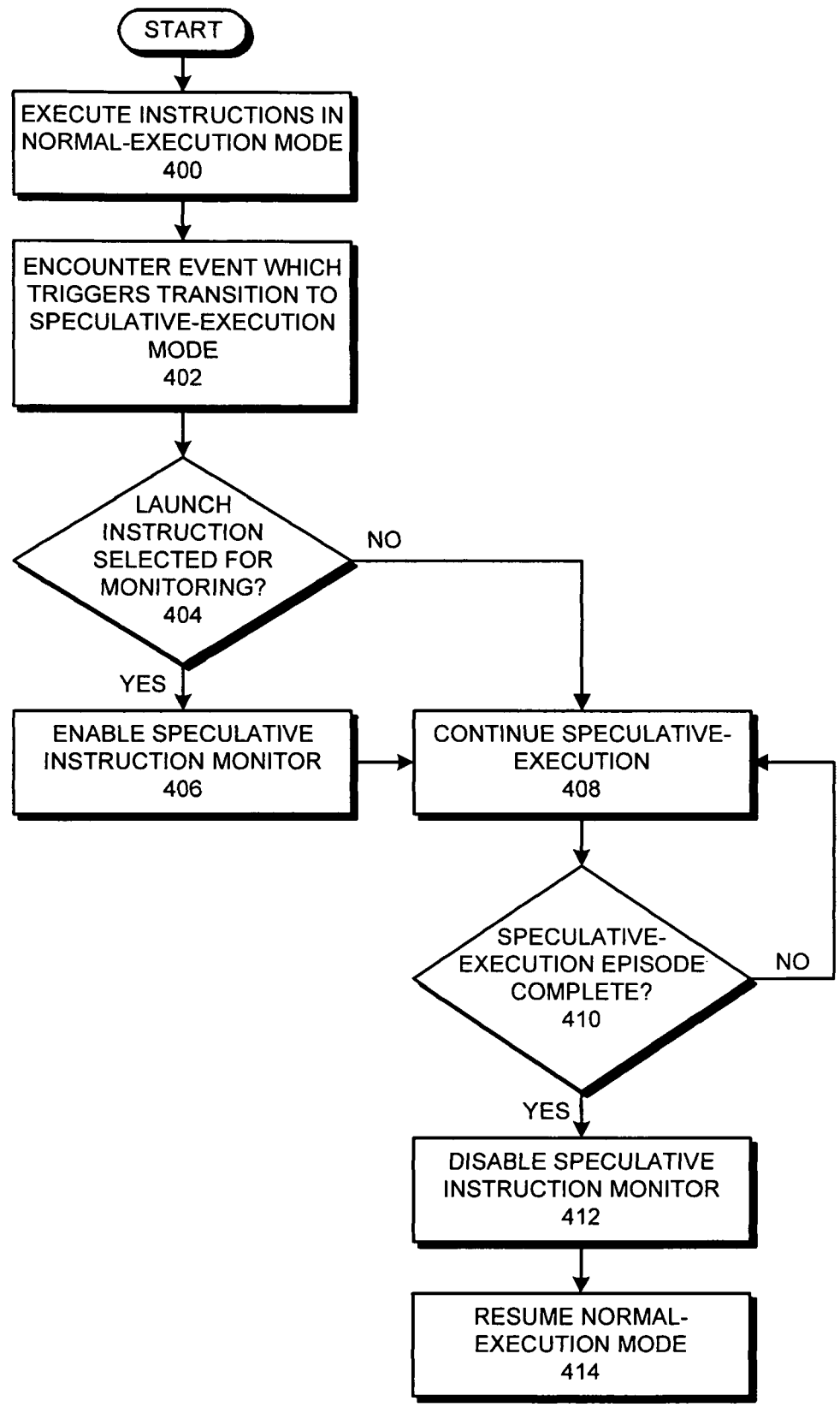
FIG. 4 presents a flowchart that illustrates the process of measuring processor performance during speculative execution in accordance with an embodiment of the present invention.

FIG. 4 presents a flowchart that illustrates the process of measuring processor performance during speculative execution in accordance with an embodiment of the present invention. For purposes of this description, we describe an instance of speculative execution as an "episode." An episode of speculative execution begins when an instruction (a "launch instruction") causes the processor to commence execution in a speculative-execution mode and ends when the processor returns to normal-execution mode 302.

The system starts with a processor executing instructions in normal-execution mode 302 (step 400). Next, the system encounters a launch instruction which causes an event that triggers a transition to speculative-execution mode (step 402). For example, the system can encounter a data-dependent stall condition which causes processor 100 to enter execute-ahead mode 304.

The system next determines if the speculative-execution episode following the launch instruction is to be monitored (step 404). In one embodiment of the present invention, in order to determine which speculative-execution episodes to monitor, the system pseudo-randomly selects launch instructions.

If the system does not select the current speculatively-executed instruction for monitoring, the system continues speculative execution (step 408). Otherwise, the system enables the speculative execution monitor (step 406) and continues speculative execution (step 408).

After being enabled, the speculative execution monitor records data relating to several aspects of the processor's performance while in speculative-execution mode. For example, the speculative execution monitor can record: (1) the thread ID; (2) the outcome of the speculative-execution episode (flush/join); (3) the failure reason (i.e., store buffer overflow, deferred queue full, trap, potential total-store-order (TSO) failure, or other failure conditions), if the speculative-execution episode fails; (4) the number of cycles in the speculative-execution episode; or (5) the program counter (PC) of the oldest instruction in the speculative-execution episode, among other data.

The speculative execution monitor can also monitor the number of instructions that fell into different categories. For example, the speculative instruction monitor can record the number of: (1) instructions that issued from the issue queue and which were not placed in the deferred queue; (2) instructions that issued from the issue queue and which were placed in the deferred queue; (3) instructions that issue from the deferred queue and which were not placed in the deferred queue; and (4) instructions that issue from the deferred queue and which were placed in the deferred queue (i.e., instructions that are re-deferred).

The system next determines whether the speculative-execution episode is complete (step 410). If so, the system disables the speculative instruction monitor (step 412). The values collected by the speculative instruction monitor can then be reported to various performance analysis tools, such as performance analysis tools bundled with an operating system or a stand-alone software application.

The results reported by the speculative instruction monitor can be filtered to adjust the number of results reported to the performance analysis tools. For example, the results can be filtered by: (1) the range of the program counter of the oldest instruction in the speculative-execution episode; (2) the number of cycles in the speculative-execution episode; (3) the thread ID; (4) the outcome of the speculative-execution episode (join/flush); and/or (5) the failure reason, if the speculative-execution episode fails.

In addition, the system can provide a "candidate counter," which is a variable that keeps track of the number of reported speculative-execution episodes to facilitate limiting the number of reported results. In one embodiment of the present invention, the candidate counter is a count-down variable which is decremented with every qualifying speculative-execution episode. When the countdown timer reaches zero, the speculative-execution episode is reported to the performance analysis tools. In one embodiment of the present invention, the candidate counter operates in conjunction with the filters described in the preceding section. For example, the candidate counter can be decremented when the thread ID matches a particular thread ID The processor then resumes execution in normal-execution mode 302 (step 414). Note that resuming execution in normal-execution mode 302 can involve using the previously generated checkpoint to resume execution from the launch instruction.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for measuring processor performance during speculative execution, comprising:
   executing instructions in a normal-execution mode;
   entering a speculative-execution episode wherein instructions are speculatively executed without being committed to an architectural state of the processor;
   wherein entering the speculative-execution episode involves enabling a speculative execution monitor which monitors instructions only during the speculative-execution episode and records data values relating only to the speculative-execution episode;
   upon determining that the speculative-execution episode is complete, disabling the speculative execution monitor and returning to normal-execution mode; and
   reporting the data values recorded by the speculative execution monitor during the speculative-execution episode only after returning to normal-execution mode, wherein the data values recorded by the speculative execution monitor facilitate measuring processor performance during speculative execution.

2. The method of claim 1, wherein reporting the data values recorded by the speculative execution monitor involves reporting the data values if a predetermined condition is met.

3. The method of claim 2, wherein the predetermined condition includes at least one of:
   a thread ID;
   an outcome of the speculative-execution episode;
   a failure reason, if the speculative-execution episode fails;
   a number of cycles in the speculative-execution episode;
   a program counter of the oldest instruction in the speculative-execution episode; and
   a number of speculative-execution episodes that have occurred since the recorded data values were last reported.

4. The method of claim 1, wherein enabling the speculative instruction monitor involves pseudo-randomly selecting the speculative-execution episode for monitoring.

5. The method of claim 1, wherein monitoring instructions during the speculative-execution episode involves recording information about the source and status of speculatively executed instructions, including information about which instructions are:
   issued from an issue queue and which are not placed in a deferred queue;
   issued from the issue queue and which are placed in the deferred queue;
   issued from the deferred queue and which are not placed back in the deferred queue; and
   issued from the deferred queue and which are placed back in the deferred queue.

6. The method of claim 5, wherein monitoring instructions during the speculative-execution episode involves recording data values which include one or more of the following:
   a thread ID;
   an outcome of the speculative-execution episode;
   a failure reason, if the speculative-execution episode fails;
   a number of cycles in the speculative-execution episode; and
   a program counter of the oldest instruction in the speculative-execution episode.

7. The method of claim 1, wherein during the speculative-execution episode, the processor operates in one of the following speculative-execution modes:
   an execute-ahead mode, wherein instructions that cannot be executed because of an unresolved data dependency are deferred, and wherein other non-deferred instructions are executed in program order; and
   a deferred mode wherein deferred instructions are executed in program order, and wherein deferred instructions that still cannot be executed because of unresolved data dependencies are deferred again.

8. An apparatus for measuring processor performance during speculative execution, comprising:
   a processor;
   an execution mechanism on the processor;
   a speculative-execution monitoring mechanism coupled to the processor;

wherein the execution mechanism is configured to enter a speculative-execution episode wherein instructions are speculatively executed without being committed to an architectural state of the processor;

when entering the speculative-execution episode, the execution mechanism is configured to enable the speculative-execution monitoring mechanism;

wherein the speculative-execution monitoring mechanism is configured to monitor instructions only during the speculative-execution episode to record data values relating only to the speculative-execution episode;

wherein upon determining that the speculative-execution episode is complete, the execution mechanism is configured to disable the speculative-execution monitoring mechanism and return to a normal-execution mode; and wherein the execution mechanism is configured to report the data values recorded by the speculative-execution monitoring mechanism during the speculative-execution episode only after returning to normal-execution mode.

9. The apparatus of claim 8, wherein the execution mechanism is configured to pseudo-randomly select the speculative-execution episode for monitoring before enabling the speculative instruction monitoring mechanism.

10. The apparatus of claim 8, wherein while monitoring instructions during the speculative-execution episode the speculative-execution monitor is configured to record information about the source and status of speculatively executed instructions, including information about which instructions are:

issued from an issue queue and which are not placed in a deferred queue;

issued from the issue queue and which are placed in the deferred queue;

issued from the deferred queue and which are not placed back in the deferred queue; and issued from the deferred queue and which are placed back in the deferred queue.

11. The apparatus of claim 10, wherein monitoring instructions during the speculative-execution episode involves recording data values which include one or more of the following:

a thread ID;

an outcome of the speculative-execution episode;

a failure reason, if the speculative-execution episode fails;

a number of cycles in the speculative-execution episode; and a program counter of the oldest instruction in the speculative-execution episode.

12. The apparatus of claim 8, wherein the execution mechanism is configured to report the data values recorded by the speculative-execution monitor if a predetermined condition is met.

13. The apparatus of claim 12, wherein the predetermined condition includes at least one of:

a thread ID;

an outcome of the speculative-execution episode;

a failure reason, if the speculative-execution episode fails;

a number of cycles in the speculative-execution episode;

a program counter of the oldest instruction in the speculative-execution episode; and a number of speculative-execution episodes that have occurred since the recorded data values were last reported.

14. The apparatus of claim 8, wherein during the speculative-execution episode, the execution mechanism is configured to operate in one of the following speculative-execution modes:

an execute-ahead mode, wherein instructions that cannot be executed because of an unresolved data dependency are deferred, and wherein other non-deferred instructions are executed in program order; and a deferred mode wherein deferred instructions are executed in program order, and wherein deferred instructions that still cannot be executed because of unresolved data dependencies are deferred again.

15. A computer system for measuring processor performance during speculative execution, comprising:

a processor;

a memory coupled to the processor, wherein the processor reads and stores data and instructions from the memory;

an execution mechanism on the processor;

a speculative-execution monitoring mechanism coupled to the processor;

wherein the execution mechanism is configured to enter a speculative-execution episode wherein instructions are speculatively executed without being committed to an architectural state of the processor;

when entering the speculative-execution episode, the execution mechanism is configured to enable the speculative-execution monitoring mechanism;

wherein the speculative-execution monitoring mechanism is configured to monitor instructions only during the speculative-execution episode to record data values relating only to the speculative-execution episode; and wherein upon determining that the speculative-execution episode is complete, the execution mechanism is configured to disable the speculative-execution monitoring mechanism, and, and to return to a normal-execution mode; and wherein the execution mechanism is configured to report the data values recorded by the speculative-execution monitoring mechanism during the speculative-execution episode only after returning to normal-execution mode.

16. The computer system of claim 15, wherein the execution mechanism is configured to pseudo-randomly select the speculative-execution episode for monitoring before enabling the speculative instruction monitoring mechanism.

17. The computer system of claim 16, wherein while monitoring instructions during the speculative-execution episode the speculative-execution monitor is configured to record information about the source and status of speculatively executed instructions, including information about which instructions are:

issued from an issue queue and which are not placed in a deferred queue;

issued from the issue queue and which are placed in the deferred queue;

issued from the deferred queue and which are not placed back in the deferred queue; and issued from the deferred queue and which are placed back in the deferred queue.

18. The computer system of claim 17, wherein monitoring instructions during the speculative-execution episode involves recording data values which include one or more of the following:

a thread ID;

an outcome of the speculative-execution episode;

a failure reason, if the speculative-execution episode fails;

a number of cycles in the speculative-execution episode; and a program counter of the oldest instruction in the speculative-execution episode.

19. The computer system of claim 15, wherein the execution mechanism is configured to report the data values recorded by the speculative-execution monitor if a predetermined condition is met.

20. The computer system of claim 19, wherein the predetermined condition includes at least one of:

a thread ID;

an outcome of the speculative-execution episode;

a failure reason, if the speculative-execution episode fails;

a number of cycles in the speculative-execution episode;

a program counter of the oldest instruction in the speculative-execution episode; and a number of speculative-execution episodes that have occurred since the recorded data values were last reported

21. The computer system of claim 15, wherein during the speculative-execution episode, the execution mechanism is configured to operate in one of the following speculative-execution modes:

an execute-ahead mode, wherein instructions that cannot be executed because of an unresolved data dependency are deferred, and wherein other non-deferred instructions are executed in program order; and a deferred mode wherein deferred instructions are executed in program order, and wherein deferred instructions that still cannot be executed because of unresolved data dependencies are deferred again.

* * * * *